United States Patent
Cooney

(10) Patent No.: US 6,604,798 B1
(45) Date of Patent: Aug. 12, 2003

(54) ENCLOSURE FOR SECURING COMPONENTS

(75) Inventor: Patrick Cooney, Willoughby, OH (US)

(73) Assignee: Integra Enclosures, Willoughby, OH (US)

( * ) Notice: Subject to any disclaimer, the term of this patent is extended or adjusted under 35 U.S.C. 154(b) by 104 days.

(21) Appl. No.: 09/636,253

(22) Filed: Aug. 10, 2000

(51) Int. Cl.$^7$ ................................................ A47B 81/06
(52) U.S. Cl. ............................ 312/223.1; 312/265.6; 248/228.1; 174/53
(58) Field of Search ............................ 312/330.1, 333, 312/348.2, 223.1, 223.2, 205, 257.1, 265.6; 248/220.1, 228.1, 298.1, 295.11, 223.41, 224.51; 174/53, 57; 361/356

(56) References Cited

U.S. PATENT DOCUMENTS

| | | |
|---|---|---|
| 93,058 A | 7/1869 | Cole |
| 1,052,701 A | 2/1913 | Watters |
| 1,469,196 A | 9/1923 | Strange |
| 2,057,269 A | 10/1936 | Schreiber |
| 2,277,269 A | 3/1942 | Wilson |
| 2,485,012 A | 10/1949 | Palmer et al. |
| 3,129,025 A | 4/1964 | Krueger |
| 3,146,011 A | 8/1964 | Seevers |
| 3,193,314 A | 7/1965 | Johnson |
| 3,490,805 A | 1/1970 | Di Pierro et al. |
| 3,584,912 A | 6/1971 | Leger |
| 3,730,576 A | 5/1973 | Schurman |
| 3,773,968 A | 11/1973 | Copp |
| 4,071,159 A | 1/1978 | Robinson et al. |
| 4,127,305 A | 11/1978 | Nielsen |
| 4,133,245 A | 1/1979 | Ruihley et al. |
| 4,213,643 A | 7/1980 | Blind et al. |
| 4,304,958 A | 12/1981 | Neff et al. |
| 4,342,136 A | 8/1982 | Okabe et al. |
| 4,475,266 A | 10/1984 | Suska |
| 4,512,598 A | 4/1985 | Coller |
| 4,524,486 A | 6/1985 | Rios et al. |
| 4,603,452 A | 8/1986 | Paciorek |
| 4,617,699 A | 10/1986 | Nakamura |
| 4,631,937 A | 12/1986 | Debus et al. |
| 4,740,655 A | 4/1988 | Ford |
| 4,779,828 A | 10/1988 | Munch |
| 4,908,733 A | 3/1990 | Zachrei et al. |
| 4,915,913 A | 4/1990 | Williams et al. |
| 4,917,421 A | 4/1990 | Wightman et al. |
| 5,084,596 A | 1/1992 | Borsh et al. |
| 5,232,277 A | 8/1993 | Cassady et al. |
| 5,245,507 A | 9/1993 | Ericksen |
| 5,259,091 A | 11/1993 | Mordick |
| 5,292,189 A | 3/1994 | Lau et al. |

(List continued on next page.)

OTHER PUBLICATIONS

Carlon Lamson & Sessions, Carlon Nonmetallic Enclosures, Jan. 1999.

Primary Examiner—Lanna Mai
Assistant Examiner—Jerry A. Anderson
(74) Attorney, Agent, or Firm—Renner, Otto, Boisselle & Sklar, LLP

(57) ABSTRACT

An enclosure for electronic and/or electrical components is disclosed, including a housing having a rear wall and longitudinally extending side walls. A longitudinally extending track is provided which includes a base leg and a pair of branch legs extending laterally therefrom. Each of the laterally extending legs is spaced apart by a gap from at least one side wall of the housing. A mounting bracket is slidable to and fro along the track, the bracket including at least one leg in sliding contact with a bearing region of the track and at least one opening for receipt therein of a fastener. The opening is positioned to direct the fastener inserted therein into engagement with a fastener engaging region of the track, whereby the at least one leg of the bracket bears against the bearing region of the track to prevent movement of the bracket relative to the track.

28 Claims, 5 Drawing Sheets

U.S. PATENT DOCUMENTS

| | | |
|---|---|---|
| 5,380,083 A | 1/1995 | Jones et al. |
| 5,388,903 A | 2/1995 | Jones et al. |
| 5,407,263 A | 4/1995 | Jones et al. |
| 5,577,295 A | 11/1996 | Papke et al. |
| 5,590,504 A * | 1/1997 | Heard et al. ............... 52/730.1 |
| 5,666,695 A | 9/1997 | Jegers et al. |
| 5,683,005 A | 11/1997 | Mordick |
| 5,722,121 A | 3/1998 | Lau et al. |
| 5,773,757 A | 6/1998 | Kenney et al. |
| 5,910,642 A | 6/1999 | Daoud |
| 5,979,119 A * | 11/1999 | Trafton ......................... 52/40 |

\* cited by examiner

ENCLOSURE FOR SECURING COMPONENTS

FIELD OF THE INVENTION

The present invention concerns an enclosure for securing components such as electronic and/or electric components and, more particularly, an enclosure including one or more tracks to which respective mounting brackets may be mounted for mounting such components within the enclosure.

BACKGROUND

Enclosures are often used to house many different electronic and/or electric components and their associated wiring and control circuitry. Typically, the components must be fastened in place and often several different components must be mounted rigidly in the same housing and/or in a fixed spatial relationship.

Oftentimes, the total production run of any one particular combination of components is somewhat limited and the cost of producing a custom enclosure is not economically justified. In such instances, enclosures having an ability to be adapted to different component mounting arrangements are used. Similarly, when performing field installation of various electrical wiring and control systems, it is often necessary to install many different combinations of components. In order to maintain the number of different enclosures required to a reasonable level, it is desirable to have enclosures which are extremely flexible in that they are able to accommodate a wide variety of components and mounting arrangements.

Some prior art enclosures include means to accommodate multiple components and mounting arrangements yet suffer from a number of drawbacks. For example, an enclosure in the shape of a box may include one or more tracks which extend from the back to the front of the enclosure. Mounting brackets which hold electrical components or the like may be slid to and fro along the track until a desired position is attained. A tool may then be inserted through a front face of the enclosure to access one or more fasteners positioned at right angles to the side walls of the enclosure and which, when tightened, engage the side wall to secure the bracket to the track.

A problem arises, however, after the adjustable brackets are positioned and secured to the respective tracks and a panel or the like is inserted into the enclosure and connected to the brackets. Once installed, the panel blocks access to the fasteners which secure the brackets to the respective tracks. Thus, the brackets cannot be adjusted to and fro along their respective tracks and, accordingly, the panel cannot be adjusted in the depth direction. A time consuming way to alleviate this problem is to first disassemble the panel from the brackets to gain access to the fasteners which secure the brackets to the respective tracks, and then adjust the brackets and reinstall the panel.

Another undesirable aspect of such mounting structure is that the fastener engages the side wall behind the track. The side wall usually consists of a relatively flat panel structure and the force exerted thereon by the fastener is a point or concentrated source at right angles. Consequently, the fastener, when engaging the respective side wall, affects, at least partially, the structural integrity of the side wall, especially over time whereby components may be repeatedly repositioned, requiring the fasteners to be repeatedly repositioned and retightened into the side wall. Of course, the thickness of the side walls may be increased to better withstand the effects of the engaging fasteners, but this results in higher material and manufacturing costs.

SUMMARY OF THE INVENTION

Broadly, the present invention provides an enclosure in the form of a box. The box has a rear wall, four side walls, and an open front face which may be closed by a cover plate or lid over its open front. The box includes four tracks which extend from the open front to the rear wall in each of the corners of the box. Each track is T-shaped with the base leg, or stem portion, of the T connected to the respective corner of the box and the cross bar of the T extending from side to side toward but not touching each adjacent side of the box. A C-shaped mounting bracket fits over the cross bar of the T-shaped track and can be slid to and fro and locked in any position along the length of the track. The C-shaped mounting bracket provides a selectively positionable mounting point for electrical components which are to be housed in the enclosure.

According to an aspect of the invention, an electrical enclosure includes a housing and a longitudinally extending track. The housing has a rear wall and longitudinally extending side walls connected to the rear wall to define an interior region. The track includes a base leg and a pair of branch legs extending laterally therefrom, each of the laterally extending legs being spaced apart by a gap from at least one side wall of the housing.

According to an embodiment of the invention, the base or stem portion of the leg of the track may be connected along its length dimension to one of the side walls of the enclosure, preferably in perpendicular relation thereto. Also, the track is connected to the rear wall, and preferably integrally formed with a side wall of the enclosure. Alternatively, the track may be a freestanding structure relative to the housing of the enclosure. The branch legs of the track are generally parallel to a side wall and extend in opposing directions from the base leg.

According to another embodiment of the invention, the track is generally T-shape in transverse cross section. Other geometries, such as Y-shape or circular shape may alternatively or also be employed.

According to another aspect of the invention, a mounting bracket for mounting components to a track includes a base portion and at least one leg extending laterally from the base portion. The base portion and leg define therebetween a longitudinally extending groove enabling the bracket to be longitudinally slid to and fro along a track corresponding in transverse cross section to a transverse cross section of the groove. The base portion includes at least one opening for receipt therein of a fastener. The opening is positioned to direct the fastener inserted therein into engagement with the track, whereby the at least one leg of the bracket bears against the track to prevent movement of the bracket relative to the track.

According to an embodiment of the invention, the at least one opening of the base portion is disposed along a first axis and the longitudinally extending groove is disposed along a second axis, and the first axis is either inclined or parallel relative to the second axis. The angle may be any angle, for example, 20°. The opening may extend longitudinally to a bottom surface of the bracket or alternatively the opening may be a blind opening.

According to another embodiment of the invention, the opening has a top portion at which a fastener may be inserted and a bottom portion at which the fastener emerges when inserted into the opening. The laterally extending leg includes a bearing region which bears against the track when the mounting bracket is secured thereto. To this end, at least a portion of the bottom portion of the opening faces a region on the opposite side of the track from the bearing region. In an embodiment, the top portion has a wider cross section than that of the bottom portion. The opening may be tapered to aid receipt of the fastener into the opening.

According to yet another aspect of the invention, a combination electrical enclosure and mounting bracket include a housing, at least one substantially longitudinally extending track, and a mounting bracket slidably moveable on the track. The housing has a rear wall and longitudinally extending side walls connected to the rear wall to define an interior region. The track extends through the interior region and defines on one side thereof a fastener engaging region and on an opposing side thereof a bearing region. The bracket includes at least one leg in sliding contact with the bearing region of the track and at least one opening for receipt therein of a fastener. The opening is positioned to direct the fastener inserted therein into engagement with the fastener engaging region of the track, whereby the at least one leg of the bracket bears against the bearing region of the track to prevent movement of the bracket relative to the track.

According to an embodiment of the invention, the at least one track is generally T-shape in transverse cross section and the mounting bracket is generally C-shape in transverse cross section and corresponds in shape to the T-shape cross section of the at least one track. The base leg of the T-shape track is connected to at least one side wall of the housing and the lateral legs thereof extend in opposing directions from the base leg. Each lateral leg defines a respective fastener engaging region and an opposing bearing region. To this end, the legs of the C-shape mounting bracket form the at least one leg and are in sliding contact with the respective bearing regions of the respective lateral legs of the T-shape bracket, whereby when the fastener is inserted into the at least one opening the legs of the C-shape bracket bear against the respective bearing regions to prevent movement of the bracket relative to the track.

According to another embodiment of the invention, there may be a pair of openings corresponding to the respective legs of the C-shape mounting bracket, whereby when a fastener is inserted into a respective opening, the respective leg of the C-shape bracket bears against the respective bearing region to prevent movement of the bracket relative to the track. The opening is disposed along a first axis and the longitudinally extending track is disposed along a second axis. The first axis is either inclined or parallel relative to the second axis. An exemplary angle may be, for example, about 20°.

The track and opening of the mounting bracket may take on other geometries, for example Y-shape and circular. To this end, the at least one track has a prescribed shape in transverse cross section and the mounting bracket has a prescribed shape in transverse cross section and corresponds in shape to the prescribed geometric cross section of the at least one track.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

DETAILED DESCRIPTION

Figure 1:
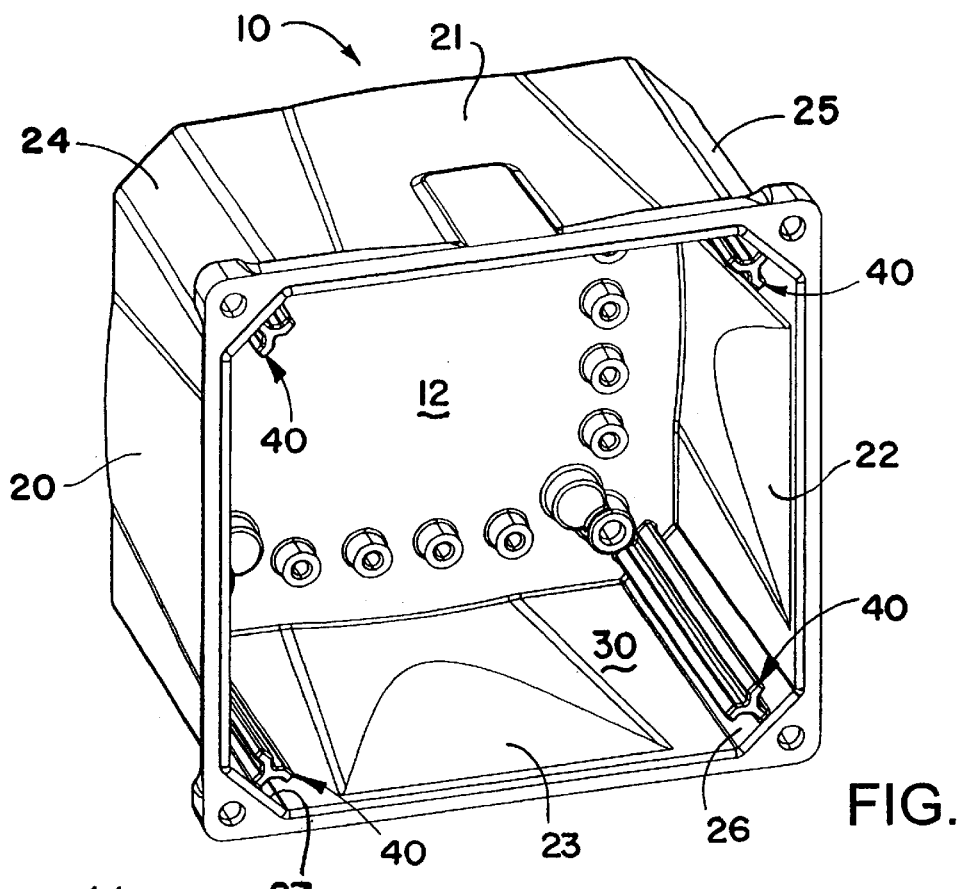
FIG. 1 is a perspective view of an electrical enclosure in accordance with the present invention.
Figure 2:
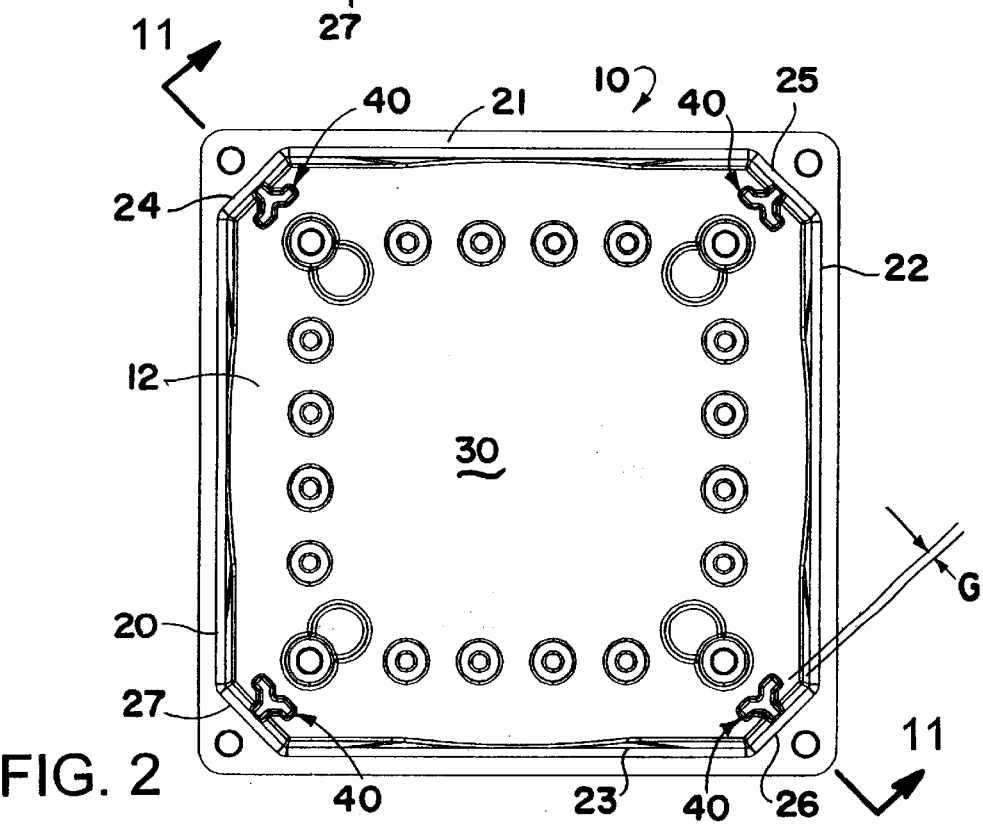
FIG. 2 is a front view of the electrical enclosure of FIG. 1.

Referring now to the drawings in general, FIGS. 1 and 2 show an electrical enclosure 10 in accordance with the present invention. Because the invention was conceived and developed in the context of electronic and electric systems, it is described herein chiefly in such context. However, the underlying principles of the invention could be adapted to other enclosure applications, for example telecommunications applications, with advantageous results.

The electrical enclosure 10 includes a rear wall 12 and four longitudinal side walls 20, 21, 22 and 23 extending substantially perpendicularly from the rear wall 12, which together define an interior region 30 of the enclosure 10. The enclosure 10 has an open front face which may be covered by a cover plate, lid or the like to seal the interior region 30. The side walls 20, 21, 22, and 23 are preferably connected therebetween, as shown, by beveled corners 24, 25, 26 and 27. Extending inwardly from the beveled corners 24, 25, 26 and 27 are respective longitudinally extending tracks 40 (one of which is shown in transverse cross section in FIG. 3). The tracks 40 preferably extend from the rear wall 12 to the front of the enclosure 10.

Figure 10:
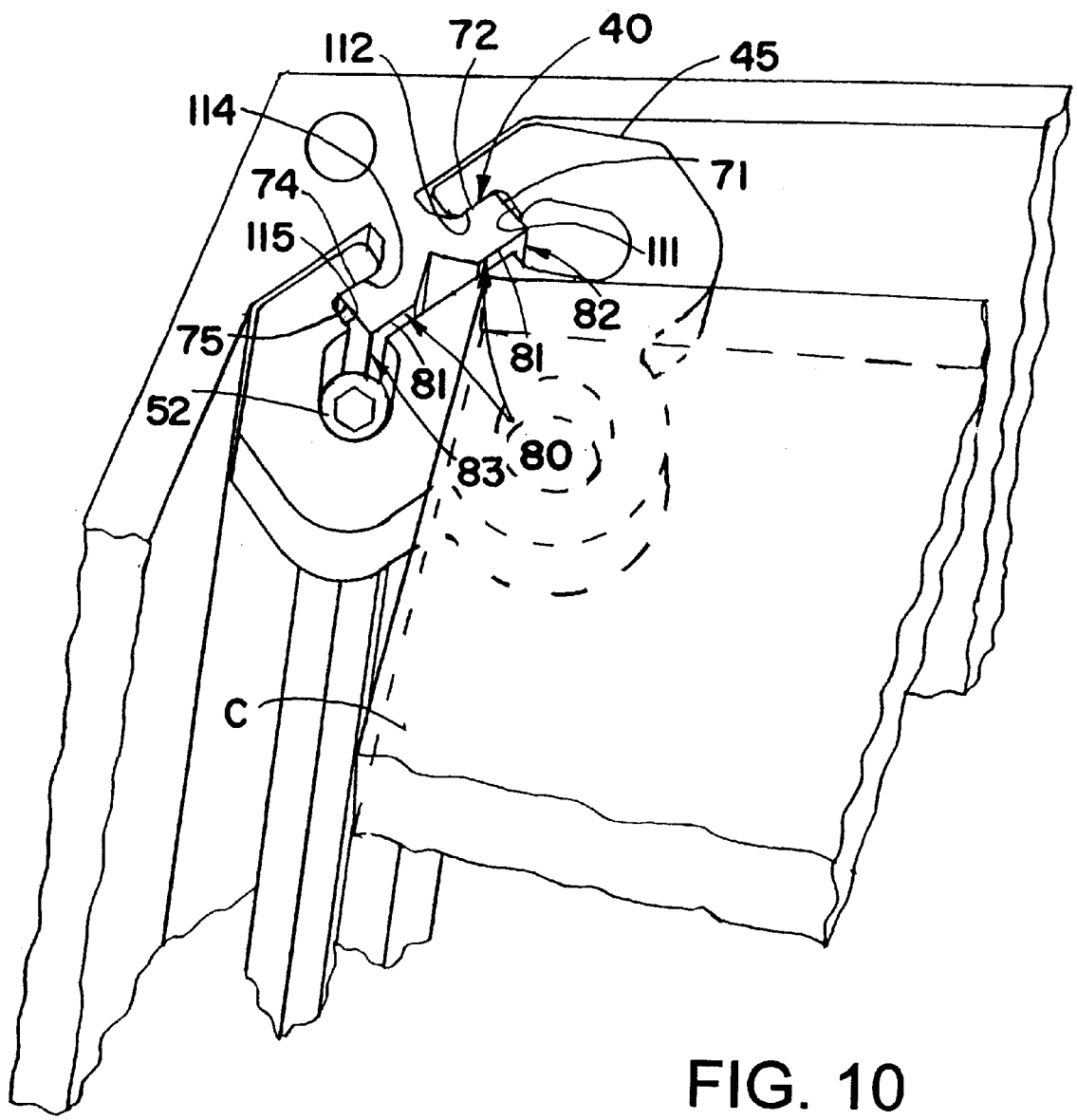
FIG. 10 is a broken view of a corner portion of the FIG. 1 enclosure showing a mounting bracket mounted to a track and a portion of a component positioned adjacent to the bracket.
Figure 13:
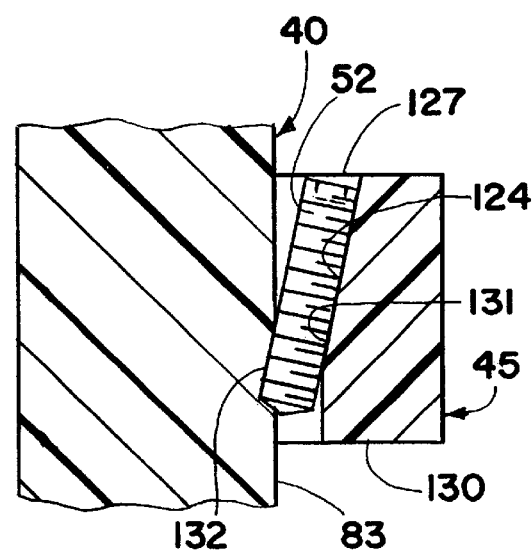
FIG. 13 is a section view of the mounting bracket of FIG. 4 as seen from the line 7—7 in FIG. 5, except that the mounting bracket is installed on a track and has a fastener mounted into an opening thereof and in engagement with the track.

The tracks 40 are sized and shaped to accommodate one or more corresponding mounting brackets 45. An exemplary bracket 45 is shown in detail in FIGS. 4–8. As described in greater detail below, the mounting bracket 45 includes a pair of grooves 50 and 51 enabling the bracket 45 to slide to and fro within the interior region 30 along the track 40 of the electrical enclosure 10. As shown in FIGS. 10 and 13, the mounting bracket 45 is adapted to receive one or more fasteners 52 for securing the mounting bracket 45 into engagement with the track 40. It will be appreciated that in general four brackets 45 are used, one with each track 40 for each component to be mounted in the enclosure, and that the tracks 40 and mounting brackets 45 enable numerous different component mounting arrangements. For example, several different components may be mounted in the electrical enclosure 10 in spaced relationship from one another along the tracks 40.

Figure 3:
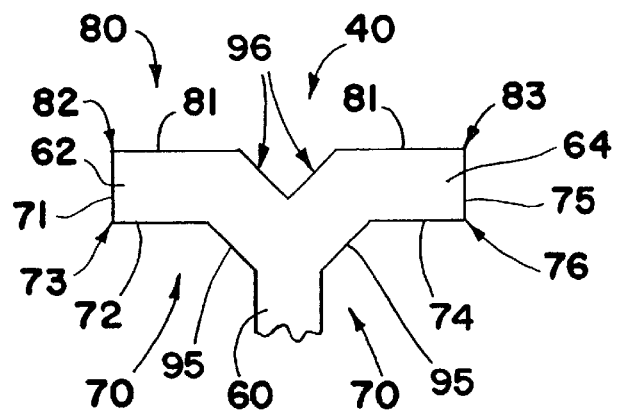
FIG. 3 is a top plan view of a track of the electrical enclosure of FIG. 1.
Figure 4:
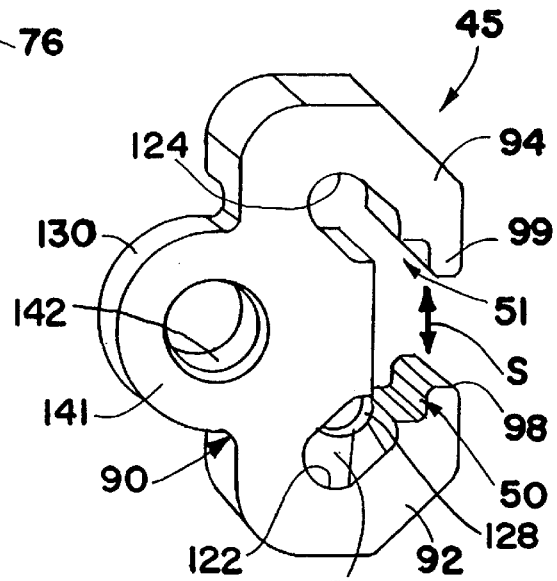
FIG. 4 is a mounting bracket in accordance with the present invention, the mounting bracket being slidably movable along the track of FIG. 3.

Referring in detail to FIGS. 1 to 3, the rear wall 12, side walls 20, 21, 22, and 23, and beveled corners 24, 25, 26 and 27 are preferably made of plastic. The tracks 40 are similarly preferably made of plastic, and are sufficiently soft to enable the fastener 52 of the mounting bracket 45 to securely engage the track 40. A suitable material has, for example, a minimum yield strength of about 4000 psi and, for example, a minimum ultimate strength of about 5000 psi. Of course, the enclosure may be made of other or alternative materials, such as metal.

It is preferred but not necessary that the enclosure 10 be made by an injection molding technique. As is standard for such manufacturing, the various walls of the enclosure 10 are provided with a slight draft angle to permit the enclosure 10 to be ejected from the mold.

The tracks 40 are preferably made integral with the beveled corners 24, 25, 26 and 27, although they may be connected thereto by welding, fastening or other known means. Alternatively, the tracks 40 may be freestanding so that, for example, they rest against the rear wall 30 without attachment or added support. This also enables the tracks 40 to be removed from and/or repositioned within the enclosure 10. Accordingly, the tracks 40 are not limited to being disposed in the corners 24, 25, 26 and 27 of the enclosure. For example, the tracks 40 may be positioned on opposing side walls, leaving the other opposing side walls free. Alternatively, the tracks 40 may be disposed away from the side walls of the enclosure 10 without connection thereto, relying instead on the rear wall and cover of the enclosure 10 for support.

As shown in the exemplary track 40 of FIG. 3, the track 40 includes a single stem or base leg 60 and a cross bar formed from a pair of legs 62 and 64 extending laterally from the base leg 60 in opposite directions. The base leg 60 is perpendicular to a respective corner portion 24, 25, 26, 27 of the enclosure 10 (FIG. 2), and each laterally extending leg 62 and 64 of the track 40 is generally parallel to and spaced apart by a gap G from the respective corner portion 24, 25, 26, 27. Thus, the tracks 40 are generally T-shape in transverse cross-section. It is noted that the tracks 40 have inner angled portions 95 and outer angled portions 96 bridging the respective laterally extending legs 62 and 64 and the base leg 60, giving the tracks 40, at least in part, a generally Y-shape in transverse cross section. The angled portions 95 and 96 assist in distributing loads acting on the laterally extending legs 62, 64 to the base leg 60 which, in turn, transfers loads to the respective corner portion 24, 25, 26 and 27 to which the base leg 60 is attached.

Each laterally extending leg 62, 64 of the track 40 includes, respectively, a longitudinally extending (into the paper in FIG. 3) bearing region 70 against which the mounting bracket 45 bears when it is secured to the track 40. The illustrated bearing region 70 is generally the back and sides of the legs 62 and 64. The bearing region 70 is defined by surfaces 71 and 72, which form a corner portion 73 of the leg 62, and surfaces 74 and 75, which form a corner portion 76 of the other leg 64.

Each leg 62, 64 of the track 40 also includes a longitudinally extending fastener engaging region 80 which may be engaged by the fastener 52 to cause the mounting bracket 45 to bear against the bearing region 70. The fastener engaging region 80 is generally the front and sides of the legs 62 and 64, being that region on the opposite side of the legs 62 and 64 of the track 40 from the bearing region 70. The illustrated fastener engaging region 80 is defined by surfaces 71 and 81, which form a corner portion 82 of the laterally extending leg 62, and surfaces 81 and 75, which form a corner portion 83 of the leg 64, the corner portions 82 and 83 being on the opposite side of the respective corner portions 73 and 76 of the track 40.

FIGS. 4–8 show a mounting bracket 45 in accordance with the present invention. The mounting bracket 45 is designed to slide along the track 40 and, as described below with reference to FIG. 10, to be locked into any position along the track 40. This allows components to be mounted in any selected for/aft position in the enclosure 10. To this end, as is most clearly shown in FIGS. 4–6, the mounting bracket 45 is generally C-shape in transverse cross-section and generally corresponds in shape to the T-shape cross section of the track 40 (FIG. 3). Also, like the tracks 40, the mounting bracket 45 is preferably made of plastic but may be made of other materials including metal.

The mounting bracket 45 includes a base portion 90 and a pair of legs 92 and 94 that extend laterally from the base portion 90. The laterally extending legs 92 and 94 of the mounting bracket 45 define, respectively, the aforementioned opposing grooves 50 and 51. The grooves 50 and 51 slidably receive the respective laterally extending legs 62 and 64 of the track 40. The laterally extending legs 92 and 94 may also correspond in size and shape to the gap G (FIG. 1) between the laterally extending legs 62 and 64 of the track 40 and the side wall 20, 22, 24, 26 to which the track 40 is attached. The grooves 50 and 51 of the mounting bracket 45 and the gap G assist in guiding the mounting bracket 45 to and fro along the track 40.

Figure 5:
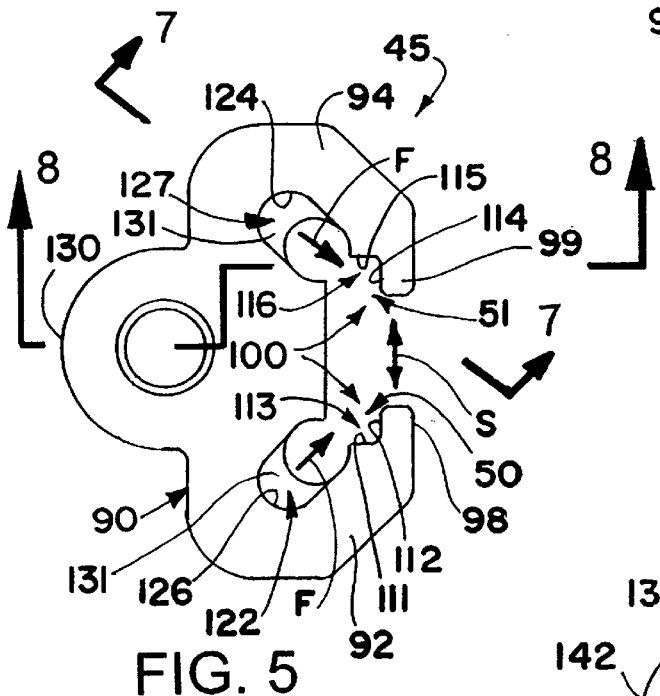
FIG. 5 is a top plan view of the mounting bracket of FIG. 4.
Figure 6:
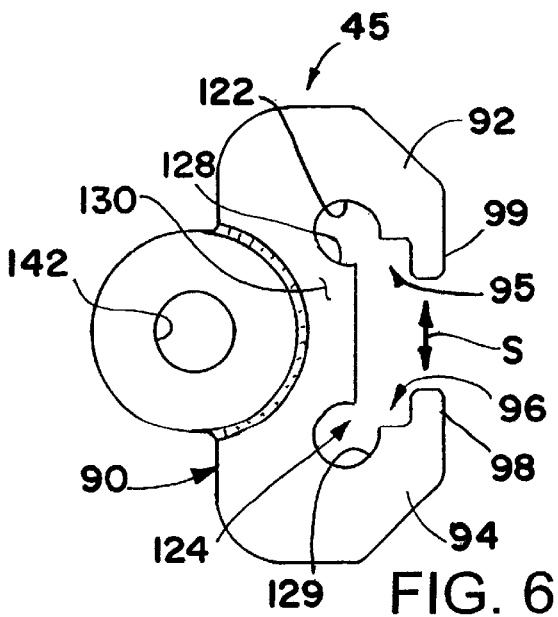
FIG. 6 is a bottom view of the mounting bracket of FIG. 4.

Opposing distal end portions 98 and 99 of the laterally extending legs 92 and 94 together define a longitudinally extending (into the paper in FIGS. 4–6) slot S in which the base leg 60 of a corresponding T-shape track 40 (FIG. 3) may be slidably received. Referring to FIG. 5, each laterally extending leg 92 and 94 also includes a longitudinally extending bearing region 100 which is defined by, respectively, surfaces 111 and 112, which form a corner portion 113 of the laterally extending leg 92, and surfaces 114 and 115, which form a corner portion 116 of the laterally extending leg 94.

In accordance with the invention, the corner portions 113 and 116 of the bearing region 100 of the mounting bracket 45 are adapted to coact with, or bear against, the corresponding corner portions 73 and 76 of the bearing region 70 of the track 40 when the mounting bracket 45 is secured thereto. More particularly, the surfaces 111, 112, 114 and 115 are adapted to bear against surfaces 71, 72, 74 and 75 when the mounting bracket 45 is mounted to the track 40.

It is noted with reference to FIG. 10 that not all surfaces 71, 72, 74 and 75 need be in contact with the surfaces 111, 112, 114 and 115 to secure the mounting bracket 45 to the track 40. It will be appreciated that since the fastener engaging region 80 of the track 40 is at corner portions 82 and 83 thereof, and the load exerted at the corner portions 82 and 83 of the track 45 is thus substantially diagonal through the transverse cross-section of the track 40 (see, for example, force arrows F in FIG. 5 indicating the direction of force exerted by the fasteners (not shown) when installed into the mounting bracket 45), a fastener 52 in engagement with the corner portion 82 will urge surfaces 72, 74 and 75 to bear against surfaces 112, 114 and 115, respectively, and a fastener 52 in engagement with the corner portion 83 (as shown in FIG. 10 and in greater detail FIG. 13) will urge surfaces 71, 72 and 74 to bear against surfaces 111, 112 and 114, respectively.

It will also be appreciated that the bearing region 70 and/or the fastener engaging region 80 of each leg 62 and 64 may vary in location depending on, for example, the particular region at which it is desired to have the fastener(s) 52 engage the track 40, the number of fasteners 52 desired to secure the mounting bracket 45 to the track 40, or the load required to be exerted on the fastener(s) 52 to secure the mounting bracket 45 to the track 40.

Referring now to FIGS. 4–7, the fastener 52 (shown in FIGS. 10 and 13) may be inserted into one of two openings 122 and 124 disposed preferably in the base portion 90 of the mounting bracket 45. The fastener 52 preferably comprises a self-tapping set screw which engages the inside wall of the opening 122, 124 when inserted therein. Alternatively, the openings 122 and 124 may be threaded to receive a particular type and/or size threaded fastener.

Each opening 122, 124 has a respective top portion 126, 127 (shown generally in FIG. 5) at which the fastener 52 is inserted. As is further described below, from the top portion 126, 127 the opening 122, 124 extends downward either parallel to or towards the track 40 to which the mounting bracket 45 is to be mounted. The opening 122, 124 also includes a bottom portion 128, 129 at which the fastener 52 emerges and engages the track 40 when inserted into the opening 122, 124.

Figure 7:
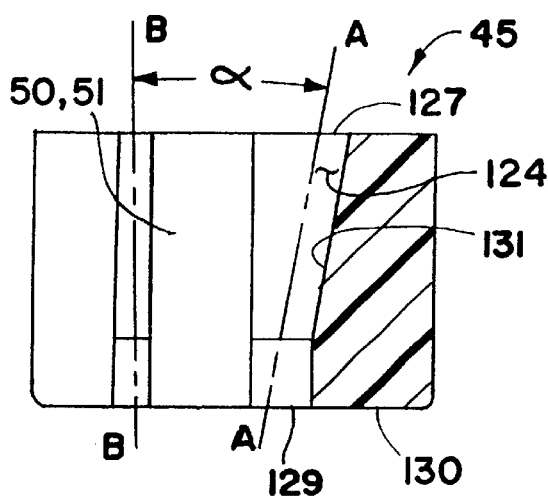
FIG. 7 is a section view of the mounting bracket of FIG. 4 as seen from the line 7—7 in FIG. 5.
Figure 7A:
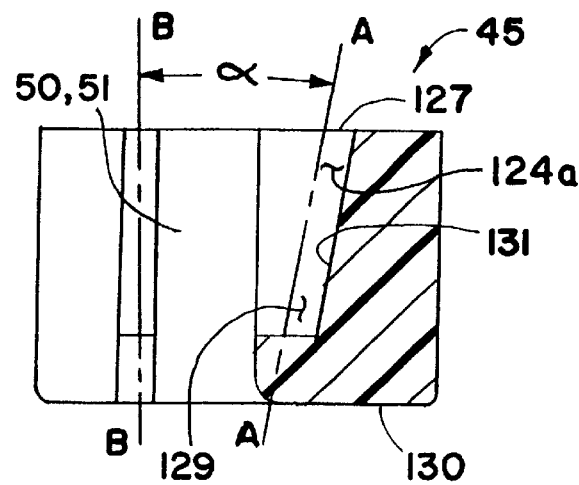
FIG. 7A is a section view of another embodiment of a mounting bracket in accordance with the present invention.

In FIG. 7, the bottom portion 128, 129 (only 129 is shown) of the opening 122, 124 (only 124 is shown) extends into the respective groove 50, 51 (see FIG. 5) and to a bottom surface 130 of the mounting bracket 45. Alternatively, as shown in FIG. 7A the mounting bracket 45 may have a blind opening 122a, 124a (only 124a is shown) in which case the bottom portion 128, 129 thereof would extend into the respective groove 50, 51 but not through the bottom surface 130 of the bracket 45. It will be appreciated that the blind opening 122a, 124a functions in substantially the same manner as the opening 122, 124 in directing the fastener 52 towards and into engagement with the track 40. Accordingly, the description herein relating to the opening 124 may be applied to the opening 124a.

The top portion 126, 127 is substantially oval shape and is relatively larger in cross section than the bottom portion 128, 129. In the FIG. 7 embodiment, the bottom portion 128, 129 of the opening 122, 124 is circular shape at the bottom surface 130 of the mounting bracket 45 (see FIG. 6). The opening 122, 124 forms a tapered portion 131 for aiding receipt of the fastener 52 into the opening 122, 124 and guiding the fastener 52 into engagement with the track 40 as hereafter described.

The opening 124 is disposed along an axis A—A. When the mounting bracket 45 is mounted on a track 40, the axis A—A may be parallel (described below) or inclined at an angle α relative to a longitudinal axis B—B along which the guide track 40 extends. As shown in FIG. 7, the opening 124 is inclined such that at least a portion of the bottom portion 129 thereof faces, or "opens up to", the fastener engaging region 80 of the track 40, and more particularly the respective corner portion 83 of the track 40, when the mounting bracket 45 is installed thereon. Similarly, although not shown in FIG. 7, at least a portion of the bottom portion 128 of the opening 122 faces the respective corner portion 82 of the track 40 when the mounting bracket 45 is mounted thereon.

Accordingly, as a fastener 52 is inserted into an opening 122, 124, the opening 122, 124 directs the fastener 52 into engagement with the respective corresponding laterally extending leg 62, 64 of the track 40 occupying the respective grooves 50, 51 of the mounting bracket 45. FIG. 13 shows the fastener 52 inserted in the opening 122, 124 and in engagement with the corner portion 83 of the track 40, the engagement being shown at 132. This causes the bearing region 100, or at least a portion of the bearing region 100, of the respective leg 92, 94 of the C-shape mounting bracket 45 to bear against the bearing region 70, or at least a portion of the bearing region 70, of the respective leg 62, 64 of the track 40 and thereby secures the mounting bracket 45 to the track 40. In effect, the fastener(s) 52 and the laterally extending leg(s) 92, 94 of the mounting bracket 45 act as a clamp, sandwiching the laterally extending leg(s) 62, 64 of the track 40 therebetween, and thereby prevent movement of the mounting bracket 45 relative to the track 40.

Figure 8:
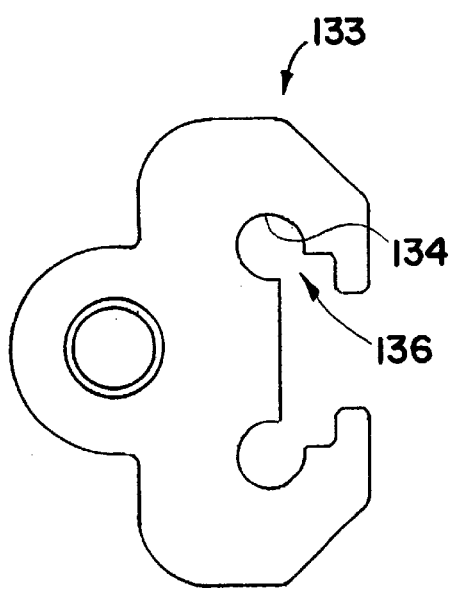
FIG. 8 is a top plan view of another embodiment of a mounting bracket in accordance with the present invention.

It will be appreciated that the angle a of inclination between the axis A—A of the opening 122, 124 and the axis B—B of the longitudinal extent of the track 40 may be any angle, including zero degrees (i.e., parallel) and that the smaller the angle, the greater is the accessibility from the front or open face of the enclosure 10 to the fastener 52. Referring briefly to FIG. 8, there is shown a mounting bracket 133 substantially similar to the mounting bracket 45 shown in FIGS. 4–7A, except that the axis of opening 134 is parallel to the axis of longitudinal extent of the track 40 (not shown). Here, the perimeter of the opening 134 has a section 136 exposed to the grooves 50, 51 of the mounting bracket 133, the section 136 extending longitudinally (i.e., through the paper) through the thickness of the mounting bracket 133. When a fastener is inserted into the opening 134, an edge of the fastener immediately engages the track 40 through the exposed section 136. Upon insertion of the fastener in the opening 134, the bracket 133 clamps to the track 40 in the manner described above with reference to the mounting bracket 45.

Although there are shown two openings 122, 124 into which a pair of fasteners 52 may be respectively inserted, the present invention contemplates the use of only one fastener 52 and, accordingly, the use of only one opening 122, 124, to secure the mounting bracket 45 to the track 40. In this way, should one of the pair of openings 122, 124 of the mounting bracket 45 and/or one of the laterally extending legs 62 and 64 of the track 40 become worn or otherwise defective, then the other opening 122, 124 and/or laterally extending leg 62 and 64 may be used.

Figure 9:
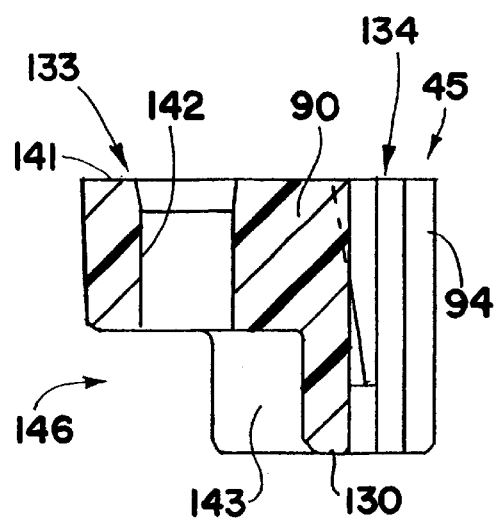
FIG. 9 is a section view of the mounting bracket of FIG. 4 as seen from the line 8—8 in FIG. 5.
Figure 11:
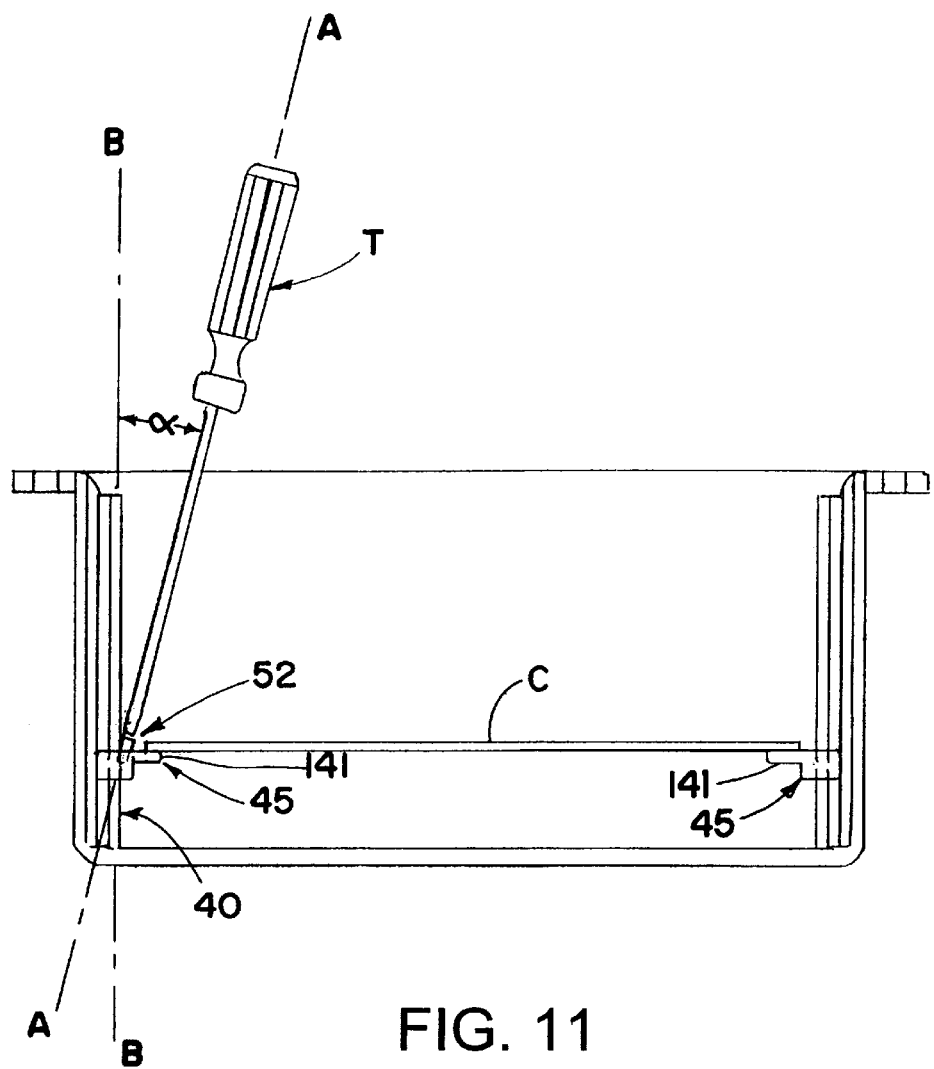
FIG. 11 is a section view of the FIG. 1 enclosure as seen from the line 10—10 in FIG. 2, the tracks of the enclosure being shown with mounting brackets mounted thereon and accessed by a tool.

Referring again to the exemplary bracket of FIG. 7, the opening 122, 124 has an angle α with respect to the longitudinally extending track 40 of about 20°. As shown in FIG. 11, this angle α facilitates easy insertion of a wrench, screwdriver or other tool T into the interior region 30 of the enclosure 10 to access and fasten the fastener 52 of the mounting bracket 45. This is advantageous over, for example, an enclosure having horizontally fastened mounting brackets wherein the tool may be too large to enable it to be inserted into the interior region of the enclosure. As can be appreciated from FIG. 11, attempting to gain horizontal access to the fastener (i.e., an angle α of 90°) may be problematic as the tool T is longer than the open front face of the enclosure 10. The present invention solves this problem via the afore described parallel relation and/or inclination between axis A—A and axis B—B, enabling access to the mounting brackets 45 through the front of the enclosure 10.b Referring now to FIGS. 4–6 and 9–10, the base portion 90 of the mounting bracket 45 includes a shelf 141 against which an electrical or telecommunications panel, bracket or other component C may be positioned. The shelf 141 has an opening or aperture 142 therein for receipt of a screw or other fastening means to secure the component to the shelf 141. As shown in FIG. 9, the shelf 141 is slightly recessed below a bottom surface 143 of the mounting bracket 45 to define a recessed portion 146 into which a fastener mating nut or the like may be seated and/or retained, if desired.

It is noted, in reference to FIG. 11, that the mounting brackets 45 of the present invention enable the panel C to be adjusted after the panel C has been installed, i.e., connected to the shelves 141. Since the installation of the panel C onto the shelves 141 does not obstruct or otherwise interfere with access to the fasteners 52, the mounting brackets 45 may be loosened and adjusted to/fro along the tracks 40, adjusting the panel C along with the brackets 45, within the interior region of the enclosure 10. Thus, the depth of the panel C from the front face of the enclosure 10 may be adjusted after the panel C is initially installed, without first having to remove the panel C from the enclosure 10, as is the case with some prior art enclosures, to permit access to the bracket fasteners. The present invention enables the panel depth to be conveniently adjusted at any time, even after the panel C has been secured to the shelves 141 of the mounting brackets 45.

Figure 12:
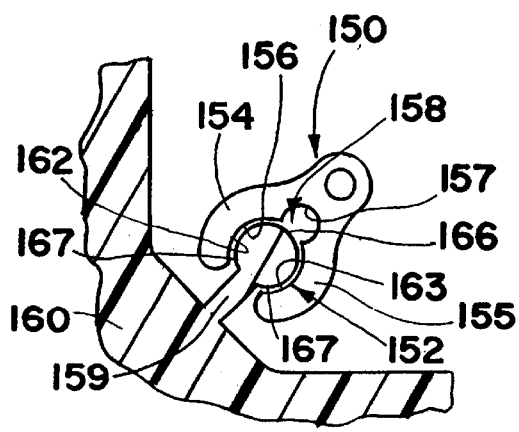
FIG. 12 is a top plan view of a mounting bracket and track in accordance with another embodiment of the invention, the track being shown connected to a side wall of an enclosure.

Referring now to FIG. 12, another embodiment of a mounting bracket 150 and track 152 in accordance with the present invention is shown. The mounting bracket 150 has a pair of arms 154 and 155 defining a groove 156 for slidably receiving the track 152 therethrough. The mounting bracket 150 includes an opening 157 for receiving therein a fastener (not shown), such as the aforementioned self tapping set screw. The fastener opening 157 runs parallel to the groove 156 and includes a section 158 exposed to the groove 156 (similar to the mounting bracket of FIG. 8).

The groove 156 is generally circular shape in transverse cross section. The track 152 is similarly generally circular shape in transverse cross section, corresponding in shape to that of the groove 156. The track 152 is shown connected to a post 159 which, in turn, is connected to a side wall 160 of an enclosure. (As was alluded to above, the track 152 may be a standalone structure relying on the rear wall and front cover of the enclosure for support).

Each leg 154 and 155 of the mounting bracket 150 has a bearing region 162 and 163 associated therewith running the length (i.e., into the paper) of the mounting bracket 150. The track 152 has a fastener engaging region 166 on one side thereof and bearing regions 167 on an opposite side thereof on opposite sides of the post 158. The fastener engaging region 166 and the bearing regions 167 run the length of the track 152. When a fastener is inserted into the opening 157 of the mounting bracket 150 the fastener engages the fastener engaging region 166 of the track 152 and urges the bearing regions 162 and 163 of the mounting bracket 150 into engagement with the bearing regions 167 of the track 152, thereby securing the mounting bracket 150 to the track 152.

Accordingly, aside from the difference in the cross sectional geometry of the groove 156 and track 152, the mounting bracket 150 and corresponding track 152 of the FIG. 12 embodiment function in substantially the same manner as the afore described mounting bracket 45 and corresponding track 40. To this end, it will be appreciated that the mounting bracket and track may take on alternative corresponding geometries, and such alternatives are contemplated as falling within the scope of the presently claimed invention.

Although the invention has been shown and described with respect to a certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. In combination, an electrical enclosure and mounting bracket, comprising:

a housing having a rear wall and longitudinally extending walls connected to the rear wall to define an interior region;

a track extending longitudinally in the interior region substantially parallel to at least one longitudinally extending wall, the track having a first portion comprising a body extending into the interior region from a longitudinally extending wall, and a second portion connected to the first portion and free of contact with the housing, the second portion having a fastener engaging surface and a bearing surface opposing the fastener engaging surface, the bearing surface and the fastener engaging surface each being spaced from the longitudinally extending walls of the housing; and, a mounting bracket slidably moveable on the track, the bracket including at least one leg in sliding contact with the bearing surface of the track and at least one opening for receipt therein of a fastener, the opening being positioned to direct the fastener inserted therein into engagement with the fastener engaging surface of the track, whereby the at least one leg of the bracket bears against the bearing surface of the track to prevent movement of the bracket relative to the track.

2. The combination of claim 1, wherein the track includes a base leg and a pair of branch legs extending laterally therefrom, each of the laterally extending legs being spaced apart by a gap from at least one longitudinally extending wall of the housing.

3. The combination of claim 2, wherein the base leg of the track is connected to at least one of the longitudinally extending walls along a length dimension of the base leg.

4. The combination of claim 2, wherein the track is connected to the rear wall.

5. The combination of claim 2, wherein the track is freestanding relative to the housing.

6. The combination of claim 2, wherein the track is generally T-shape in transverse cross section.

7. The combination of claim 2, wherein the track is generally Y-shape in transverse cross section.

8. The combination of claim 2, wherein the track is integrally formed with the at least one longitudinally extending wall.

9. The combination of claim 2, wherein the base leg is connected to the at least one longitudinally extending wall in perpendicular relation.

10. The combination of claim 2, wherein the laterally extending branch legs are generally parallel to the at least one longitudinally extending wall.

11. The combination of claim 2, wherein the laterally extending branch legs extend in opposing directions from the base leg.

12. The combination of claim 1, wherein the mounting bracket includes a base portion and at least one leg extending laterally from the base portion, the base portion and leg defining therebetween a longitudinally extending groove enabling the bracket to be longitudinally slid to and fro along the track, the track corresponding in transverse cross section to a transverse cross section of the groove, and wherein the base portion includes the least one opening.

13. The combination of claim 12, wherein the fastener is a self tapping set screw.

14. The combination of claim 12, wherein the at least one opening of the base portion is disposed along a first axis and the longitudinally extending groove is disposed along a second axis, the first axis being parallel relative to the second axis.

15. The combination of claim 12, wherein the at least one opening is a blind opening.

16. The combination of claim 12, wherein the at least one opening has a top portion at which a fastener may be inserted and a bottom portion at which the fastener emerges when inserted into the opening.

17. The combination of claim 16, wherein the laterally extending leg includes a bearing surface which bears against the track when the mounting bracket is secured thereto, and wherein at least a portion of the bottom portion of the opening faces a region on the opposite side of the track from the bearing surface.

18. The combination of claim 17, wherein the top portion has a wider cross section than that of the bottom portion.

19. The combination of claim 12, wherein the at least one opening is tapered and the taper aids receipt of the fastener into the at least one opening.

20. The combination as set forth in claim 1, wherein the track is generally circular shape in transverse cross section and the mounting bracket is generally C-shape in transverse cross section and corresponds in shape to the circular cross section of the track.

21. The combination as set forth in claim 1, wherein the track has a transverse cross sectional shape and the mounting bracket has a transverse cross sectional shape that corresponds in shape to the transverse cross sectional shape of the track.

22. The combination as set forth in claim 1, wherein the track is connected to the housing.

23. The combination as set forth in claim 1, wherein the track is generally T-shape in transverse cross section and the mounting bracket is generally C-shape in transverse cross section and corresponds in shape to the T-shape cross section of the track.

24. The combination as set forth in claim 23, wherein the T-shape track includes a base leg and a pair of lateral legs, wherein the base leg of the T-shape track is connected to at least one longitudinally extending wall of the housing and the lateral legs thereof extend in opposing directions from the base leg, each lateral leg defining a respective fastener engaging surface and an opposing bearing surface; and wherein the C-shape mounting bracket includes a pair of mounting bracket legs, wherein the mounting bracket legs of the C-shape mounting bracket form said at least one leg and are in sliding contact with the respective bearing surfaces of the respective lateral legs of the T-shape bracket, whereby when the fastener is inserted into the at least one opening the mounting bracket legs of the C-shape mounting bracket bear against the respective bearing surfaces to prevent movement of the C-shape mounting bracket relative to the track.

25. The combination as set forth in claim 24, wherein the at least one opening comprises a pair of openings corresponding to the respective legs of the C-shape mounting bracket, whereby when a fastener is inserted into a respective opening, the respective leg of the C-shape bracket bears against the respective bearing surface to prevent movement of the bracket relative to the track.

26. The combination as set forth in claim 1, wherein the track is generally Y-shape in transverse cross section and the mounting bracket is generally C-shape in transverse cross section and corresponds in shape to the Y-shape cross section of the track.

27. The combination as set forth in claim 1, wherein the opening of the at least one bracket is disposed along a first axis and the track is disposed along a second axis, the first axis being inclined relative to the second axis.

28. The combination as set forth in claim 27, wherein the angle of inclination is about 20 degrees.

\* \* \* \* \*